United States Patent
Schmidt et al.

(10) Patent No.: US 6,782,845 B1
(45) Date of Patent: Aug. 31, 2004

(54) IVC RACK SYSTEM AND METHOD FOR DETECTING INFECTIONS PARTICLES WITHIN AN IVC RACK SYSTEM

(75) Inventors: Jörg Schmidt, München (DE); Markus Brielmeier, Garching (DE)

(73) Assignee: GSF-Forschungszentrum fur Umwelt und Gesundheit GmbH (DE)

(*) Notice: Subject to any disclaimer, the term of this patent is extended or adjusted under 35 U.S.C. 154(b) by 0 days.

(21) Appl. No.: 10/296,691
(22) PCT Filed: Jun. 6, 2000
(86) PCT No.: PCT/EP00/05199
§ 371 (c)(1), (2), (4) Date: Jul. 18, 2003
(87) PCT Pub. No.: WO01/91543
PCT Pub. Date: Dec. 6, 2001

(51) Int. Cl.[7] ................................. A01K 1/03
(52) U.S. Cl. ....................... 119/419; 119/420
(58) Field of Search ............... 119/417, 418, 119/419, 420, 421

(56) References Cited

U.S. PATENT DOCUMENTS

| 4,022,054 A | 5/1977 | Biederman | 73/23.34 |
|---|---|---|---|
| 4,249,482 A | * 2/1981 | Harr | 119/419 |
| 4,348,985 A | 9/1982 | Leong | 119/420 |
| 4,398,498 A | * 8/1983 | Moss et al. | 119/420 |
| 4,402,280 A | * 9/1983 | Thomas | 119/418 |
| 4,723,511 A | 2/1988 | Solman et al. | 119/224 |
| 5,429,800 A | * 7/1995 | Miraldi et al. | 422/26 |
| 5,996,535 A | 12/1999 | Semenuk et al. | 119/456 |
| 6,308,660 B1 | * 10/2001 | Coiro et al. | 119/419 |

FOREIGN PATENT DOCUMENTS

| GB | 2277587 A | 11/1994 |
|---|---|---|
| WO | WO 99/11119 | 3/1999 |

* cited by examiner

*Primary Examiner*—Robert P. Swiatek
(74) *Attorney, Agent, or Firm*—Moore & Van Allen PLLC; Michael G. Johnson

(57) ABSTRACT

IVC rack system comprising a plurality of IVC cages 13 for test animals which are supplied with sterile air, wherein samples of exhaust air from the IVC cages 13 are supplied from sampling points 15 to at least one sentinel cage 24 housing sentinel animals as bio-indicators for the detection of infectious particles within the exhaust air samples, and to at least one particle sampling filter 33 for the identification of pathogens.

14 Claims, 6 Drawing Sheets

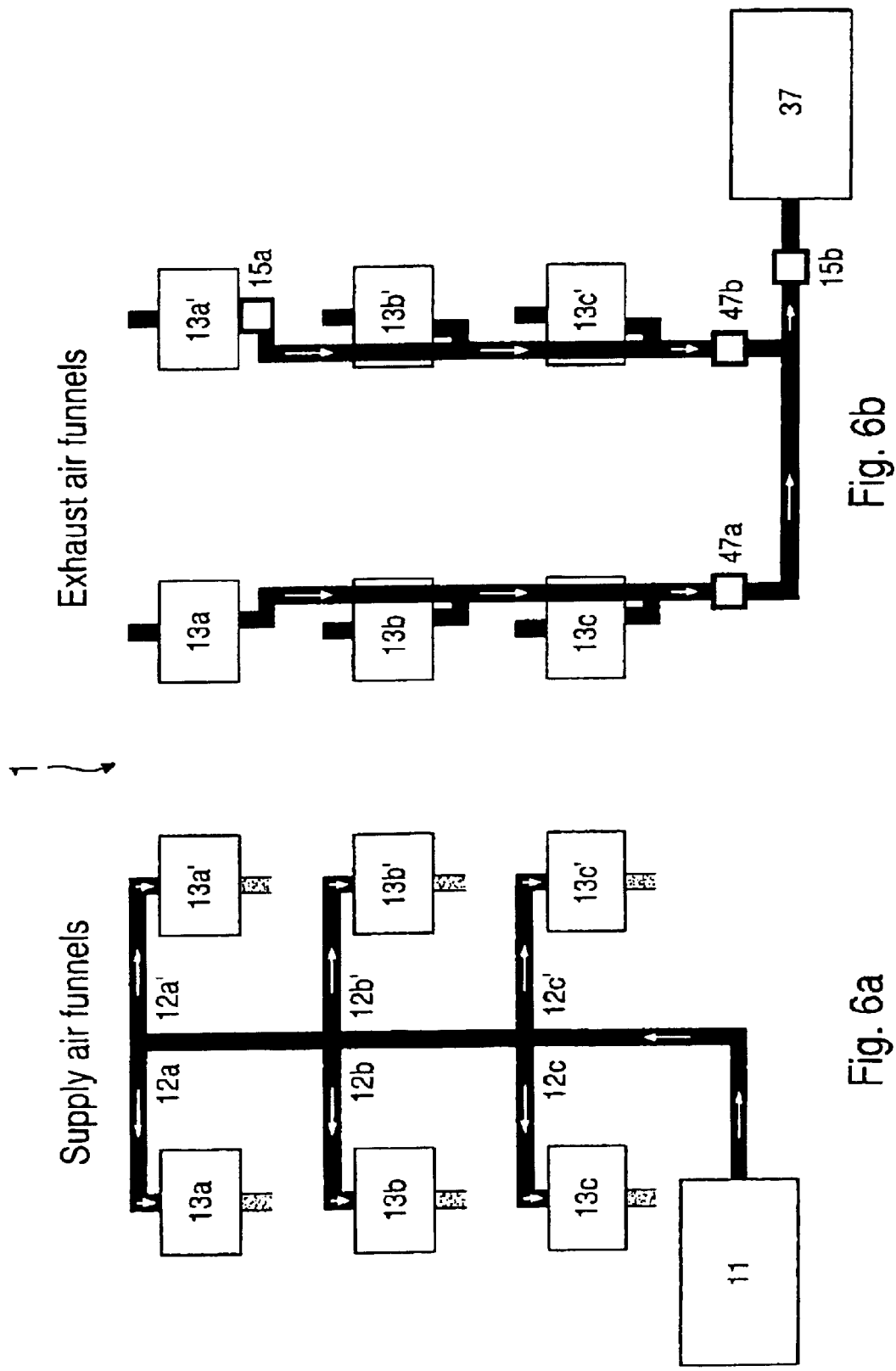

IVC RACK SYSTEM AND METHOD FOR DETECTING INFECTIONS PARTICLES WITHIN AN IVC RACK SYSTEM

The present invention refers to an IVC rack system and a method for detecting infectious particles within an IVC rack system and more specifically to the improvement of microbiological monitoring of laboratory mice, gerbils, hamsters and rats or other laboratory animals housed under specific sterile conditions.

In the field of experimental medicine and laboratory animal science, IVC rack systems (IVC: Individually Ventilated Microisolator-Cages) are used for housing test animals such as laboratory mice, gerbils, hamsters and rats. In IVC rack systems, the test animals are supplied with sterile air to improve the test results performed with the test animals. Specific pathogen-free (SPF) laboratory mice and rats gain rapidly increasing importance in basic and applied biomedical research. The breeding and housing of SPF-mice, gerbils, hamsters and rats or other laboratory animals requires germ-free environment and a defined climate for the animals within the barrier system. The IVC cages represent a set of individual microbarrier cages, which facilitate housing of test animals in a specific pathogen-free containment.

FIG. 1 shows a conventional IVC rack system in principle. In this conventional IVC rack system, ambient room air is drawn by a ventilator through a pre-filter for absorbing particles and then through a HEPA-particle filter (HEPA: High.Efficiency Particle Absorber) via an inlet blower and is finally distributed to the individual IVC cages. The IVC cages are supplied individually with sterile air through a manifold and supply specific air-supply diffusers which are mounted on the IVC cages. The IVC cages contain test animals for biomedical investigations. The test animals breath the sterile air and produce exhaust air which is passively conveyed or drawn by a ventilator to a particle filter unit or to the building exhaust system. The particle filter unit shown in FIG. 1 comprises a pre-filter, the ventilator and a HEPA-filter filtering the exhaust air generated by the test animals within the IVC cages. The filter exhaust air can then be reintroduced into the rack system or output into the ambient room.

FIG. 2 shows the conventional IVC rack system according to the prior art in more detail. As can be seen from FIG. 2, the IVC rack system according to the prior art comprises a plurality of IVC cages within different rows. The sterile supply air is transferred via a vertical supply plenum to different horizontal supply air manifolds connected to the IVC cages. The exhaust air of the IVC cages within a row are output via a horizontal exhaust air manifold.

In an IVC rack system, all IVC cages are supplied individually with the sterile supply air, and there is no exchange of air between the IVC cages. For performing biomedical investigations, the test animals within the IVC cages have to be taken out by the investigating scientist. During the investigation of the test animals, it is possible that the investigated test animals will be infected with viruses, bacteria or parasites. The infected animals will be put back into the IVC cage and infect further test animals. Another possibility for infecting the test animals is a defect input particle filter unit which does not generate sterile supply air. The exchange of laboratory test animals with other laboratories is another source for possible infections of test animals. A still further possibility is that the test animals are already infected when put initially into the IVC cage. These latent infected test animals will either develop an overt or acute infection and disease and infect the other test animals within the same IVC cage.

Since there is no air exchange between the IVC cages, a monitoring of the experimental test animal colony by investigating sample animals taken from different IVC cages is not helpful, because infections within other IVC cages remain undetected. In the case of new infections of test animals in the IVC rack system, there is a high risk that the infection of the test animal colonies spreads during handling and bedding changes before being detected.

Accordingly, it is an object of the present invention to provide an IVC rack system and a method for detecting infectious particles within any cage of an IVC rack system, wherein infections within the IVC rack system are detected within a very short period of time.

This object is achieved with an IVC rack system having the features of main claim 1 and by a detection method comprising the features of claim 13.

The invention provides an IVC rack system comprising
a plurality of IVC cages for test animals which is supplied with sterile air,
wherein samples of exhaust air from the IVC cages are supplied from sampling points to at least one sentinel cage housing sentinel animals as bio-indicators for the detection of infectious particles within the exhaust air samples.

In a preferred embodiment, the sentinel animals act as bio-indicators for the detection of infectious pathogens.

These infectious pathogens are preferably air-born pathogens.

The IVC cages and the sentinel cages comprise in a preferred embodiment pressure gauges to control the air pressure within the IVC rack system.

In a further preferred embodiment of the IVC rack system according to the present invention, the sentinel cages comprise an input air-flow regulation faucet to regulate the influx of exhaust air samples into the sentinel cage.

In a further preferred embodiment, the sentinel cages comprise each an output air-flow regulation faucet to regulate the outflow of exhaust air from the sentinel cage.

The sterile air is preferably supplied via manifolds and enters the IVC cages by air-supply diffusers mounted on the IVC cages.

In a preferred embodiment, an input particle filter unit for generating sterile air is provided comprising a pre-filter which is supplied with ambient room air and a HEPA-filter connected to the pre-filter to generate sterile air from the pre-filtered ambient room air.

In a still further preferred embodiment of the IVC rack system according to the present invention, an output particle filter unit is provided comprising a pre-filter which filters the exhaust air from the IVC cages and the exhaust air from the sentinel cage and a HEPA-filter connected to the pre-filter.

The test animals and the sentinel animals are preferably laboratory mice, gerbils, hamsters or rats.

In a preferred embodiment of the IVC rack system according to the present invention the IVC rack system is a single sided IVC rack system.

In an alternative preferred embodiment of the IVC rack system according to the present invention the IVC rack system is a double sided IVC rack system.

In a preferred embodiment of the IVC rack system according to the present invention, a sampling point is provided at every row of the IVC cages within the IVC rack system.

In a further preferred embodiment of the IVC rack system according to the present invention a sampling point is provided at the vertical exhaust plenum of the IVC rack system.

In an alternative embodiment, a sampling point is provided at each IVC cage of the IVC rack system.

This provides the advantage that the exact location of the source of infection within the IVC rack system can be detected.

Preferred embodiments of the IVC rack system and the method for detecting infectious particles within an IVC rack system are described with reference to the Figures to explain essential features of the present invention.

FIGS. 6a, 6b show the supply and exhaust air funnels of an IVC rack system according to a preferred embodiment of the present invention.

Figure 1:
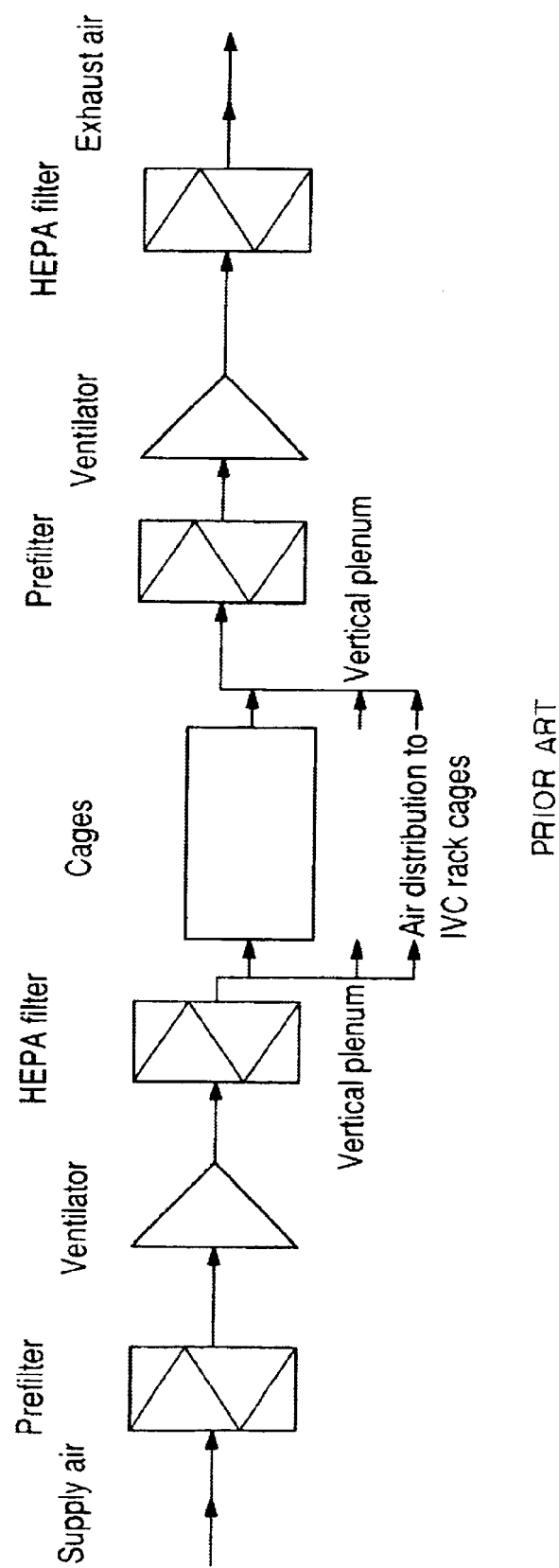
FIG. 1 is a block diagram showing an IVC rack system according to the prior art.
Figure 2:
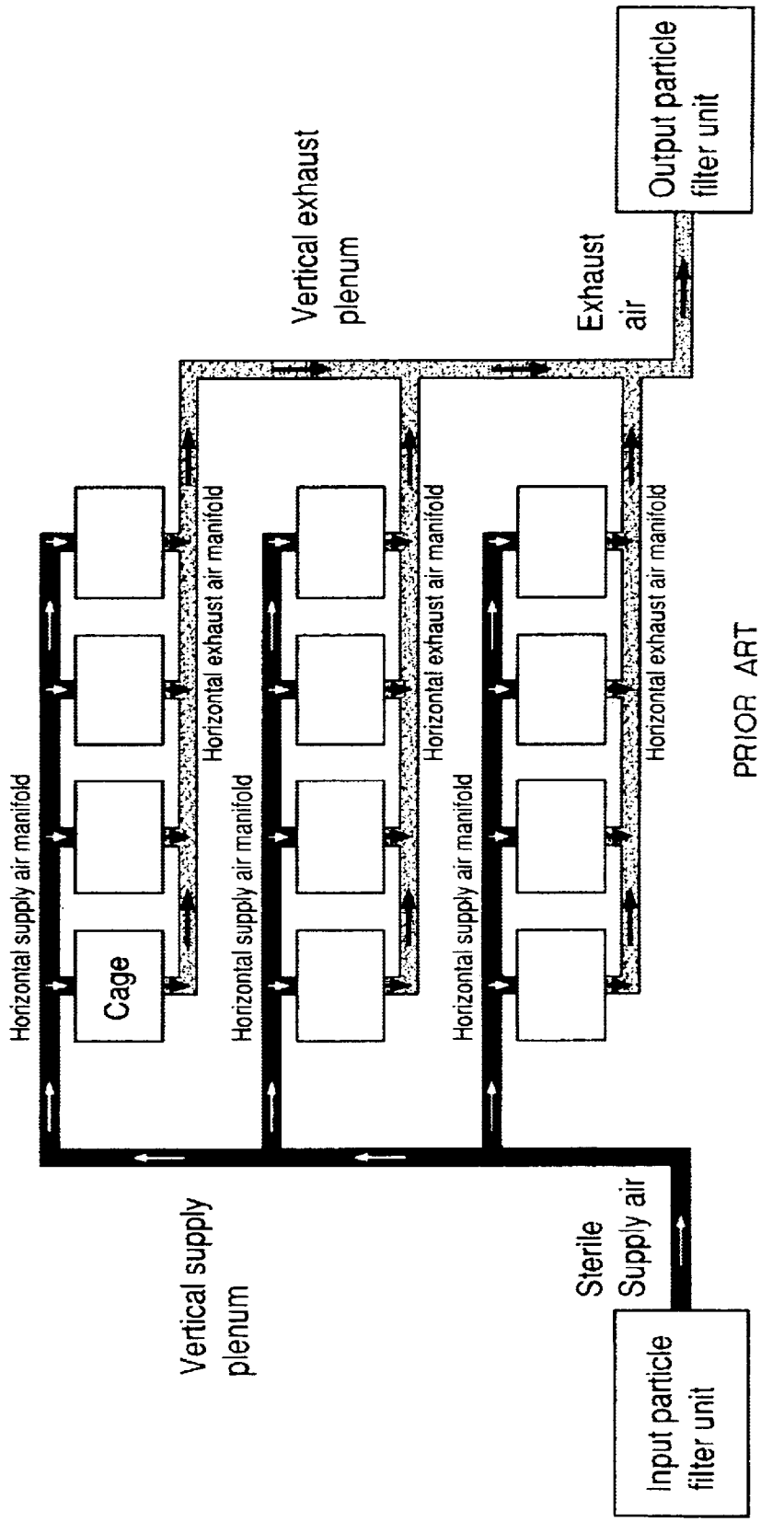
FIG. 2 shows the structure of an IVC rack system according to the prior art.

The IVC rack system 1 comprises an air input 2 through which ambient room air is supplied through an air tube 3 to a pre-filter 4 which absorbs particles within the ambient room air. The ambient room air is drawn into the pre-filter 4 by means of a ventilator 5 connected to the output side of the pre-filter 4 via a tube 6. The ventilator 5 transfers the pre-filtered air through a tube 7 and an air-flow regulation faucet 8 to a HEPA-filter 9. The air-flow regulation faucet 8 is controlled via a control line 10 by a control unit. The pre-filter 4, the ventilator 5 and the HEPA-filter 9 are part of an input particle filter unit 11. The input particle filter unit 11 generates sterile air from the ambient room air. This sterile air is supplied via manifolds 12a–12c by air supply diffusers to the IVC cages 13a, 13b, . . . 13n.

The IVC cages 13 are used for breeding and housing of test animals such as laboratory mice, gerbils, hamsters and rats. The exhaust air generated within the IVC cages 13 are transferred via exhaust air manifolds to a sampling point 15. From the sampling point 15, samples of exhaust air are supplied via a sample air tube 16 to an input 17 of an infection monitoring unit 18. The infection monitoring unit 18 comprises an input tube 19 connected to a ventilator 20 which draws in the exhaust air samples from the sampling point 15. On the input side, the ventilator 20 is connected via a tube 21 to an air-flow regulation faucet 22 controlled by a control unit via a control line 23. The air sample sucked in by the ventilator 20 is supplied to a sentinel cage 24 through a tube 25. The sentinel cage 24 contains sentinel animals as bio-indicators for the detection of infectious particles within the exhaust air samples supplied to the infection monitoring unit 18 via sample air tube 16. Infectious air-born pathogens which originate from the test animals within the IVC cages 13 are supplied to the sentinel animals within the sentinel cage 24. The sentinel animals are preferably of the same species as the monitored test animals within the IVC cages 13. The sentinel animals can be bred especially for the purpose as bio-indicators for the detection of infectious particles within the exhaust air samples. They are selected or preferably bred in such a way that they are very sensitive to infections.

The infection monitoring unit 18 comprises an exhaust tube 26 connected to an air-flow regulation faucet 27 controlled by the control unit via control line 28. The air-flow regulation faucet 27 delivers the exhaust air from the sentinel cage 24 through a tube 29 to a ventilator 30 which transfers the exhaust air via an output tube 31 to an output 32 of the infection monitoring unit 18.

The infection monitoring unit 18 preferably further comprises a particle sampling filter 33 connected to the input tube 25 via a tube 34 and to the output tube 36 via tube 51, tube 31 and tube 35. The particle sampling filter 33 can be used for sampling infectious particles supplied to the sentinel cage 24 such as bacteria. By incubating the sampling filters 33 on bacteriological plates these bacteria can be cultivated, investigated and characterized.

The exhaust air of the infection monitoring unit 18 is supplied from the exhaust output 32 via tube 35 to an exhaust pipe 36.

Figure 3:
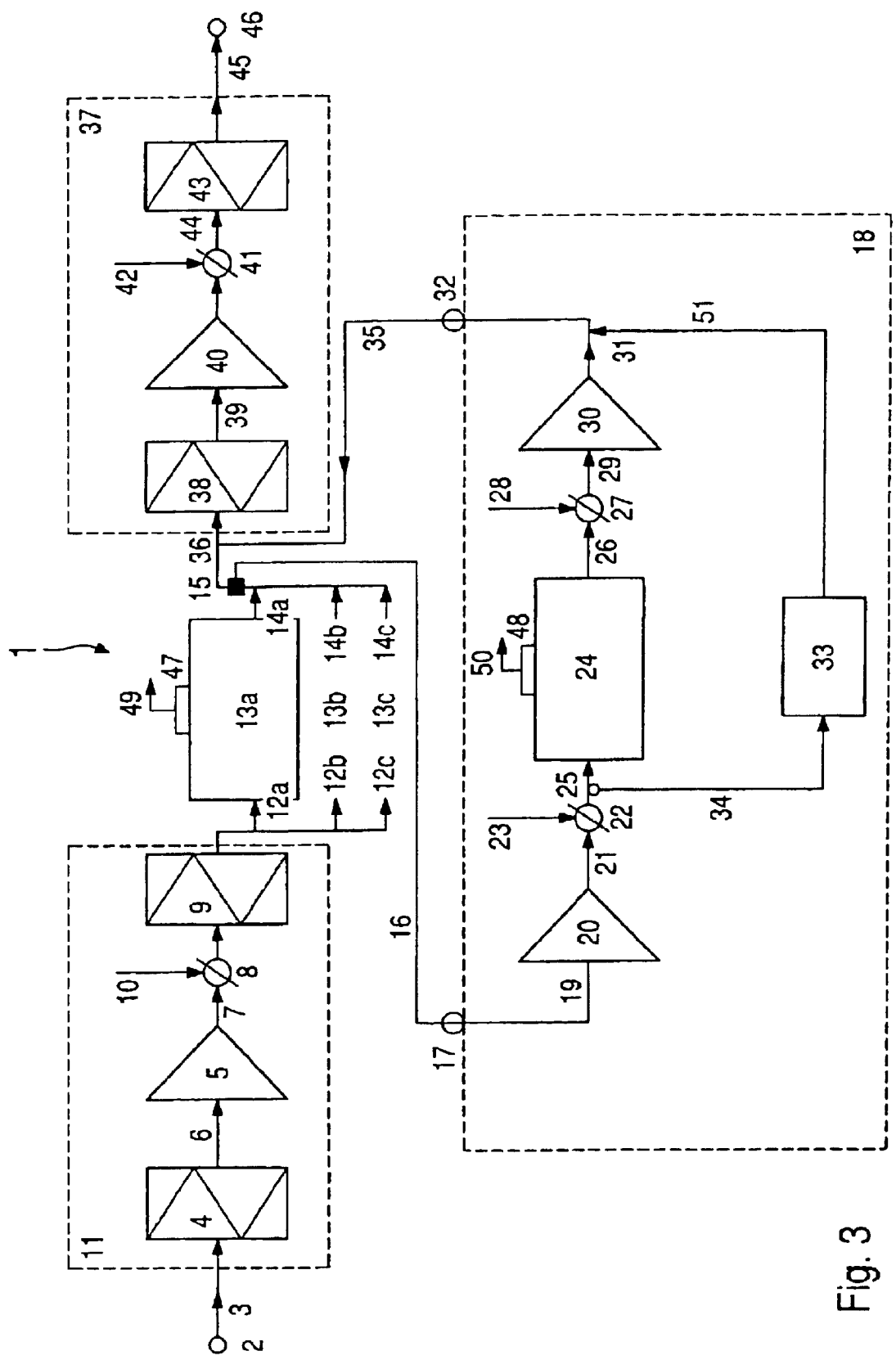
FIG. 3 shows a block diagram of an IVC rack system according to the present invention.

In the preferred embodiment, as shown in FIG. 3, the exhaust pipe 36 is connected to an output particle filter unit 37 comprising a pre-filter 38. The pre-filter 38 has on its output side a tube 39 through which the exhaust air is drawn in by the ventilator 40. The output particle filter unit 37 further comprises an air regulation faucet 41 controlled by a control unit via a control line 42. The exhaust air drawn in by the ventilator 40 is supplied to a HEPA-filter 43 via tube 44. The HEPA-filter 43 absorbs the particles and outputs the filtered exhaust air through a tube 45 to an exhaust air output 46 of the IVC rack system 1.

The IVC cages 13 as well as the sentinel cage 24 contain pressure gauges 47, 48 for measuring the pressure within the cages. The pressure gauges 47, 48 generate pressure detection signals which are supplied to the control unit via detection lines 49, 50.

By means of the pressure detection gauges 47, 48 and the air regulation faucets 8, 22, 27, 41 which are all connected to a control unit it is possible to regulate the air pressure within the IVC cages 13 and within the sentinel cage 24.

In normal operation, the pressure within the test IVC cages 13 and the sentinel cages 24 is controlled to be higher than the ambient air pressure. This ensures that no ambient air will enter the IVC cages 13 and the sentinel cages 24. However, when experimenting with highly infectious substances, the pressure within the test cages 13 and the sentinel cages 24 is controlled by the control unit to be lower than the ambient air pressure. This ensures that no air within the cages 13, 24 will leave the IVC rack system and endanger scientists within the ambient room or the environment. The sentinel animals within the sentinel cage 24 are taken out from the sentinel cage 24 and are investigated periodically or when the behavior of the sentinel animals becomes noticeable. It is checked whether the sentinel animals generate antibodies or show changes in their body-tissues. These results can additionally be compared with the infectious particles sampled within the particle sample filter 33 of the infection monitoring unit 18.

Figure 4:
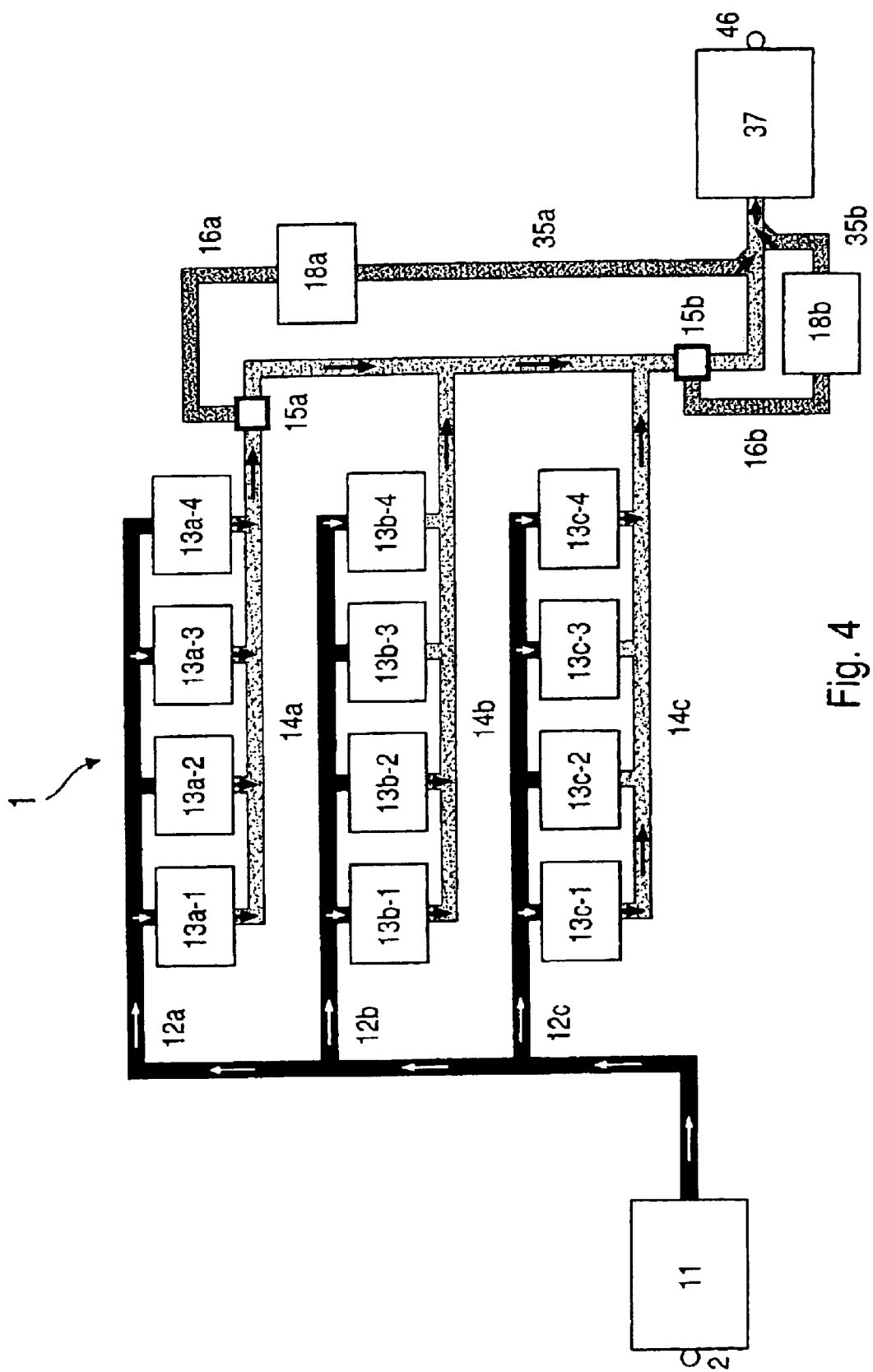
FIG. 4 shows a preferred embodiment of an IVC rack system according to the present invention.

FIG. 4 shows a schematic frontal view of a one-sided IVC rack system 1 according to the present invention. In this embodiment, there is provided an infection monitoring unit 18a for monitoring infections within cages 13a in a first row of the rack system 1. To each row of the rack system 1, a row infection monitoring unit 18a can be connected via the row sampling point 15a and a sample supply tube 16a. Further, the rack infection monitoring unit 18b is connected at a rack sampling point 15b to receive exhaust air samples from all cages within the IVC rack system 1. Each row of the rack system 1 comprises a plurality of IVC cages 13 which are individually supplied with sterile air from horizontal supply air manifolds 12a, 12b, 12c. All cages 13 within a row output the generated exhaust air via horizontal exhaust air manifolds 14a, 14b, 14c which are connected to a vertical exhaust plenum of the IVC rack system 1.

The provision of an infection monitoring unit 18a for each row makes it possible to locate the source of the infection within the IVC rack system 1 and to undertake the necessary steps to control or eliminate the infection.

Figure 5:
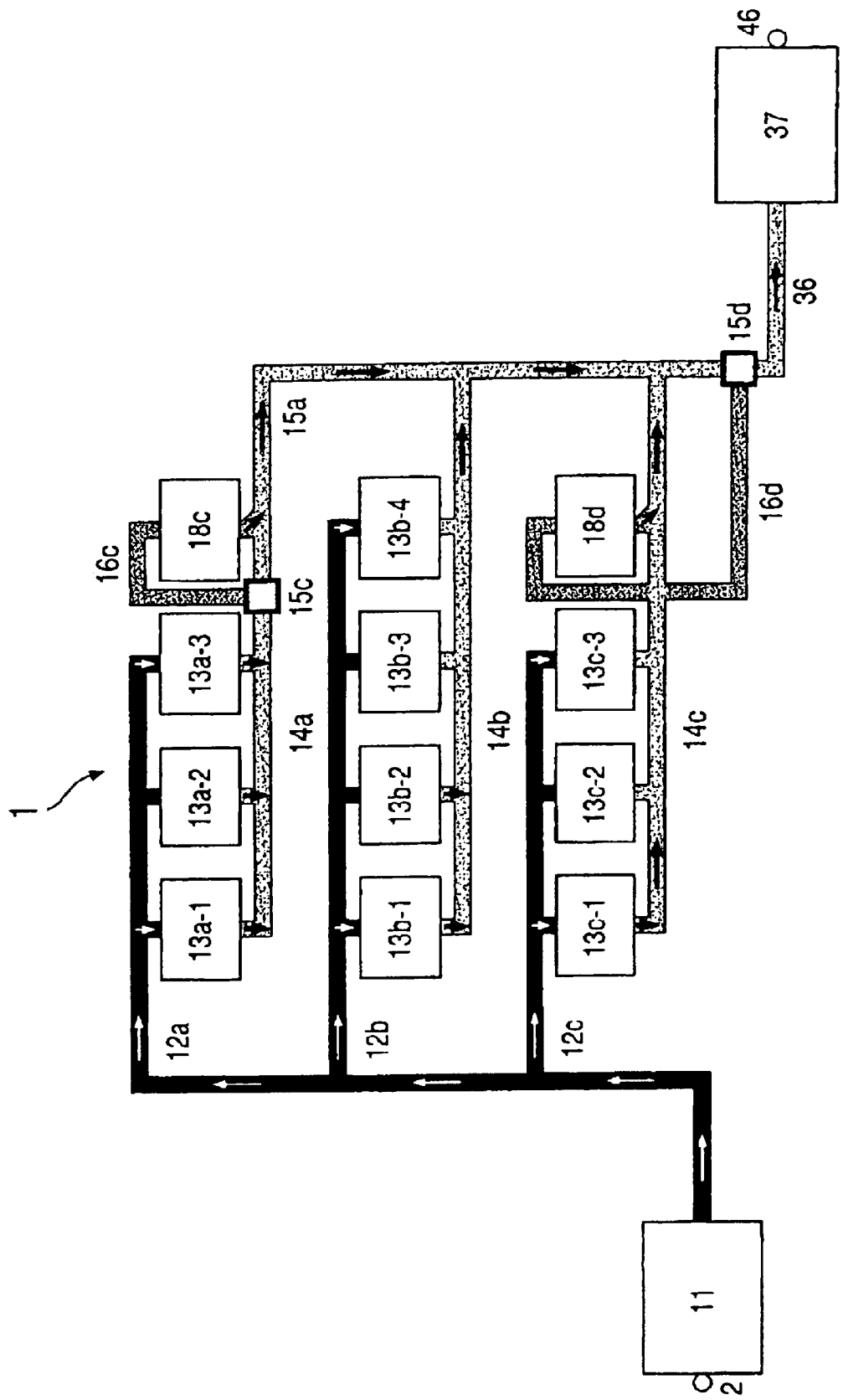
FIG. 5 shows another preferred embodiment of the IVC rack system according to the present invention.

FIG. 5 shows a schematical front view of a one-sided IVC rack system with factory-set infection monitoring units 18c, 18d. As can be seen from FIGS. 4 and 5, the present invention can be used either as an additional device for conventional IVC rack systems or for IVC rack systems which are manufactured to include the infection monitoring units 18.

FIGS. 6a, 6b are lateral views of a double-sided IVC rack system according to the present invention. As can be seen from FIG. 6b, there is provided a row sampling point 15a for row a within the IVC rack system 1. There can be provided a row sampling point for each row within the IVC rack system 1. Further, there is a rack sampling point 15b for monitoring the exhaust air of the whole rack system 1. Additional side sampling points 47a, 47b make it possible to decide on which side of the IVC rack system 1 the infection has occurred.

In an alternative embodiment, an infection monitoring unit 18 is connected to each IVC cage 13 of the IVC rack system 1. With this embodiment it is possible to detect the exact location of the infection within the IVC rack system 1 at once.

The IVC rack system 1 according to the present invention facilitates the rapid detection of new infections with air-born pathogens of the test animals housed in the IVC cages 13 by the use of the sentinel animals within the sentinel cage 24. The sentinel animals are exclusively exposed to exhaust air from the IVC-test animal cages 13.

For detecting the infectious particles within the IVC cages 13 of the IVC rack system 1, the ambient air is first filtered to generate sterile air which is supplied to the IVC cages 13 which contain the test animals. The infected test animals distribute the excreted infectious air-born pathogens with their exhaust air. At least one sentinel cage 24 housing the sentinel animals is supplied with this exhaust air from the IVC cages 13. The infectious particles within the exhaust air are detected by means of the sentinel animals which act as bio-indicators. The sampling tube introduced in the exhaust air funnel carries part of the total expired air from all test animals within the IVC cages 13 to the infection monitoring unit 18. The sample air containing the potential air-born pathogens from the experimental test animals is drawn into the sentinel cage 24 by means of the ventilator 20. The exhaust air of the sentinel animals is drawn by fan 30 and fed back to the exhaust air funnel of the IVC rack.

To sample individually defined sets of test animal cages in the IVC rack system 1, the exhaust air from the experimental test animal cages 13 can be either sampled by row sampling, side sampling or rack sampling. Row sampling is executed at the end of each horizontal exhaust manifold before the point of entry of the exhaust air into the vertical plenum tube of the rack system. Side-sampling is executed at the end of each vertical plenum tube in double-sided racks. Rack-sampling is executed from the combined exhaust plenum before the exhaust air is drawn either into the output particle filter unit 37 or into the building exhaust system.

The air pressure and the air flow within the IVC rack system 1 is controlled by a control unit which controls the air regulation valves. A continuous air-flow at low velocity within the IVC rack system guarantees continuous air changes per individual IVC cage 13 and per hour.

What is claimed is:

1. An individually ventilated microisolator-cages (IVC) rack system comprising a plurality of IVC cages for housing test animals, means for individually supplying the cages with sterile air, a sentinel cage for housing a sentinel animal, and means for supplying the sentinel cage with exhaust air from the IVC cages, wherein the sentinel animal serves as a bio-indicator for the detection of infectious particles within the exhaust air samples.

2. The IVC rack system according to claim 1, wherein the sentinel cage and the IVC cages comprise pressure gauges for measuring pressure within the cages.

3. The IVC rack system according to claim 1, wherein the sentinel cage comprises an input air-flow regulation valve for regulating the influx of exhaust air into the sentinel cage.

4. The IVC rack system according to claim 1, wherein the sentinel cage comprises an output air-flow regulation valve for regulating the outflow of exhaust air from the sentinel cage.

5. The IVC rack system according to claim 1, wherein the sterile air supplying means comprises a manifold, and further comprising an air supply diffuser mounted on each of the cages, wherein the sterile air enters the IVC cages through the air supply diffusers.

6. The IVC rack system according to claim 1, wherein the sterile air supplying means comprises an input particle filter unit including a pre-filter, means for supplying ambient room air to the pre-filter, and a HEPA-filter connected to the pre-filter to generate the sterile air from the pre-filtered ambient room air.

7. The IVC rack system according to one claim 1, further comprising an output particle filter unit including a pre-filter which filters the exhaust air from the IVC cages and the exhaust air from the sentinel cage; and a HEPA-filter connected to the pre-filter.

8. The IVC rack system according to claim 1, wherein the test sentinel animal is selected from laboratory mice, gerbils, hamsters or rats.

9. The IVC rack system according to claim 1, wherein the exhaust air supplying means comprises a sampling point provided for a subset of IVC cages within the IVC rack system.

10. The IVC rack system according to claim 1, wherein the exhaust air supplying means comprises an exhaust plenum, and a sampling point provided at the vertical exhaust plenum.

11. The IVC rack system according to claim 1, wherein the exhaust air supplying means comprises a sampling point for each IVC cage within the IVC rack system.

12. The IVC rack system according to claim 1, further comprising a particle sampling filter for sampling infectious particles supplied to the sentinel cage.

13. Method for detecting infectious particles within an individually ventilated microisolator-cages (IVC) rack system, wherein each IVC cage is provided for housing test animals, the method comprising the following steps:
 (a) filtering of ambient air to generate sterile air;
 (b) supplying the IVC cages of the IVC rack system with the sterile air;
 (c) providing a sentinel cage housing a sentinel animal;
 (d) supplying the sentinel cage with exhaust air from the IVC cages; and
 (e) detecting infectious particles within the exhaust air by means of the sentinel animals which act as bio-indicators.

14. The method according to claim 13, further comprising the steps of filtering the exhaust air, and detecting the infectious particles within the filtered exhaust air.

* * * * *